Aug. 19, 1941.                  H. GASS                    2,252,804
                            ANTICHATTER DEVICE
                            Filed Aug. 16, 1940
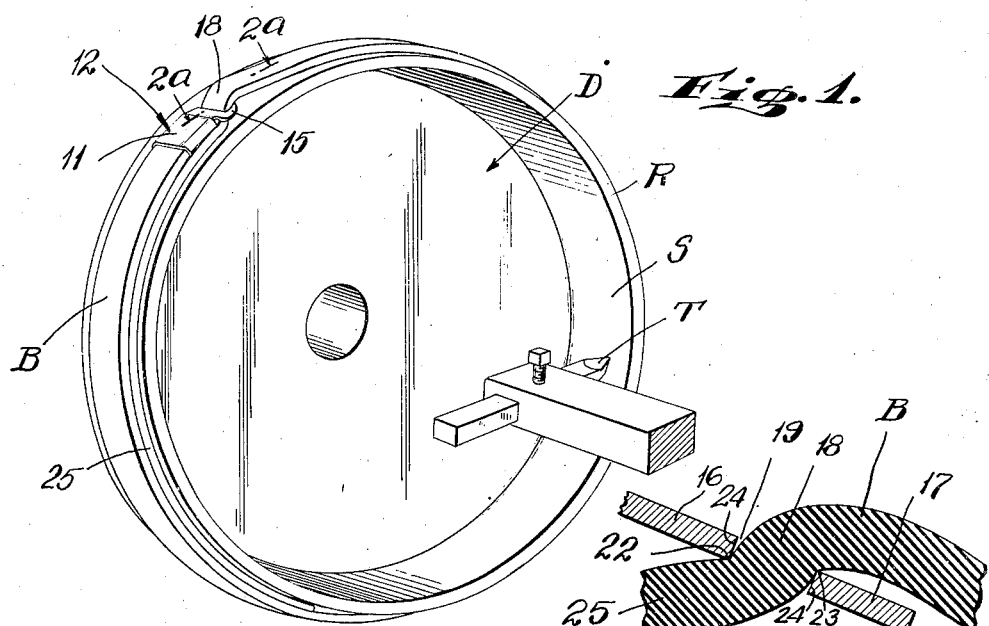
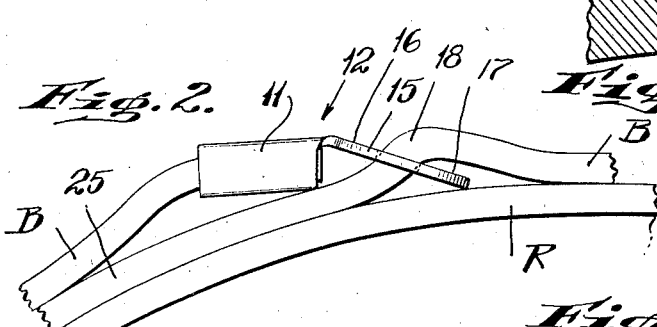
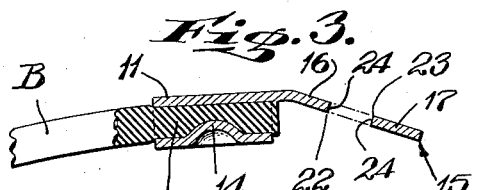
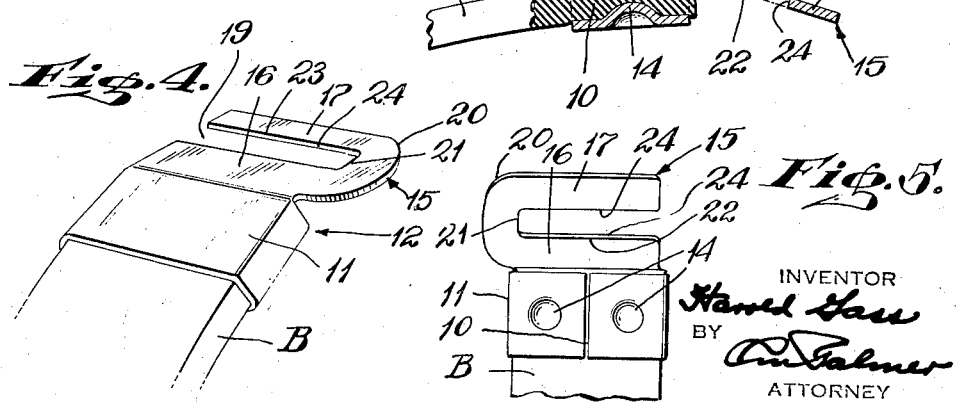
INVENTOR
Harold Gass
BY
       C. W. Palmer
ATTORNEY Patented Aug. 19, 1941

2,252,804

UNITED STATES PATENT OFFICE 2,252,804

ANTICHATTER DEVICE

Harold Gass, New York, N. Y.

Application August 16, 1940, Serial No. 352,869

3 Claims. (Cl. 24—198)

The subject matter of this invention relates to stabilizing means for dampening undesirable chattering of hollow bodies during internal processing thereof and the objects, advantages and functional and structural features of the invention will be apparent from the following detailed disclosure considered in the light of the accompanying drawing wherein:

Fig. 1 is a perspective view of the chatter dampening device shown mounted about a hollow brake drum.

Fig. 2 is a fragmentary side view of Fig. 1.

Fig. 2ª is an enlarged sectional view on the line 2ª—2ª of Fig. 1.

Fig. 3 is a longitudinal sectional view on the belt grasping buckle.

Fig. 4 is a perspective view of the buckle and

Fig. 5 is an underneath view of Fig. 4.

Where a hollow body such as a brake drum, is mounted for rotation, certain chatter or bodily vibration of the rim of the drum takes place unless the rim is exteriorly reinforced by appropriate dampening means for adequately absorbing such chatter. In the embodiment illustrated the dampening means takes the form of a relatively hard and slightly elastic rubber band or belt B detachably wrapped exteriorly of the annular rim R of the brake drum D.

In actual practice the drum is appropriately mounted on a lathe (not shown) and suitably rotated whereby a rectilinearly movable tool T can be utilized to process the internal annular surface S of the drum during rotation of the latter.

The elastic belt B is rectangular in cross section and has one end 10 firmly retained or anchored in the rectangularly shaped socket 11 of the buckle generally designated 12 by the spaced detents 14 pressed inwardly into the body of end 10. In this way longitudinal displacement of the buckle relative to the belt or band is prevented.

The buckle however comprises a relatively flat U-shaped member or yoke 15 which is integral with the rectangularly shaped socket 11 but is disposed at an incline or bias to the long axis of socket or in other words angularly overhangs socket 11 at which time of course the spaced arms 16 and 17 of the yoke are in alinement.

With the brake drum mounted in the usual manner in the lathe, the flexible belt B is thereafter wrapped about the outer cylindrical surface of the annular rim R but in such a manner that an intermediate portion 18 thereof is inserted into the gap 19 defined by the spaced inclined but alined arms 16 and 17 of the U-shaped yoke 15 and against stop end wall 21 of the gap 19.

It will be observed that the width of the belt is substantially coextensive with the length of the gap 19 and consequently by reason of the biased relation of the yoke 15 the entire length of the alternate rectilinear edges 22 and 23 only of the opposed rectilinear walls 24 of gap 19 penetrate or depress or pinch locally the inserted intermediate belt portion 18 and hence firmly grip or compress to hold the inserted portion of the belt against longitudinal slippage thereof relative to the biased yoke or the buckle which may be of metal or of any suitable material. In this way the belt is held tightly about the drum as desired to reinforce the latter for dampening the vibrations thereof as the drum rotates with the belt.

By the present arrangement the tail or free portion 25 of the belt may be conveniently tucked or positioned under the belt to be firmly but removably retained against the rim R, thus eliminating undesirable flapping thereof as the drum rotates.

Pursuant to processing of the surface S on the part of the tool T, the belt is removed from the drum and this is accomplished by manually withdrawing the tail portion 25 from under the body of the belt after which the arched portion 18 is disengaged from holding edges 22 and 23 and thereafter laterally removed from gap 19.

Various changes may be made in details of construction and arrangement of parts without departing from the spirit of the invention or sacrificing any of the advantages thereof inherent therein.

I claim:

1. A buckle for use with a strap comprising a hollow socket for firmly securing one end of said belt, and a yoke integral with and overhanging said socket and disposed in an inclined relation to the longitudinal axial plane of said socket and including spaced arms having spaced rectilinear walls defining a gap for removably receiving a portion of said belt and disposed transversely of said buckle, said walls being disposed in an inclined relation to said plane and defining alternate edges adapted to removably grip opposite outside faces of said portion to retain the latter against slippage in a direction longitudinally of said buckle.

2. A buckle for use with a flexible strap comprising a hollow socket for firmly securing one end of said belt, and a U-shaped yoke integrally merged with and downwardly and outwardly overhanging said socket and disposed in an inclined relation to the longitudinal axial plane of said socket and including spaced arms having spaced rectilinear walls defining a gap for removably receiving a portion of said belt and disposed transversely of said buckle, said walls being disposed in an inclined relation to said plane and defining opposite and alternate corner edges, the latter being adapted to removably pinch opposite outside faces of said portion to retain the latter against slippage in a direction lengthwise of said buckle.

3. A buckle for use with a resilient strap comprising a hollow socket for firmly securing one end of said belt, and a relatively U-shaped yoke integrally merged with and overhanging one end of said socket and disposed in an inclined relation to the longitudinal axial plane of said socket and including alined and spaced arms having opposing and spaced rectilinear walls defining a gap for removably receiving a portion of said belt and disposed transversely of said buckle, said walls being disposed in an inclined relation to said plane and defining alternate and opposite and relatively rectilinear corner edges, the latter only adapted to removably pinch opposite outside faces of said portion to retain the latter against slippage lengthwise of said buckle.

HAROLD GASS.